(12) United States Patent
Randjelovic et al.

(10) Patent No.: US 8,500,030 B2
(45) Date of Patent: Aug. 6, 2013

(54) ELECTRONIC CIRCUIT FOR A RESPONDER WHICH IS NOT INITIALISED WHEN THE SUPPLY VOLTAGE IS SWITCHED ON

(75) Inventors: Zoran Randjelovic, Marin (CH); Maksimilijan Stiglic, Maribor (SI)

(73) Assignee: EM Microelectronic-Marin SA, Marin (CH)

( * ) Notice: Subject to any disclaimer, the term of this patent is extended or adjusted under 35 U.S.C. 154(b) by 678 days.

(21) Appl. No.: 12/345,520

(22) Filed: Dec. 29, 2008
(Under 37 CFR 1.47)

(65) Prior Publication Data
US 2009/0173794 A1    Jul. 9, 2009

(30) Foreign Application Priority Data
Dec. 27, 2007  (EP) ..................................... 07150450

(51) Int. Cl.
*G06K 19/05*  (2006.01)
(52) U.S. Cl.
USPC ........................................... 235/492; 235/451
(58) Field of Classification Search
USPC .................. 235/435, 439, 441, 451, 487, 492
See application file for complete search history.

(56) References Cited

U.S. PATENT DOCUMENTS

| | | | | |
|---|---|---|---|---|
| 3,621,357 | A * | 11/1971 | Kubo et al. | 318/600 |
| 5,838,956 | A * | 11/1998 | Kawasaki et al. | 713/500 |
| 6,962,293 | B2 | 11/2005 | Kim | |
| 2002/0196889 | A1 * | 12/2002 | Tamura et al. | 375/373 |
| 2004/0025035 | A1 * | 2/2004 | Jean-Claude et al. | 713/189 |
| 2004/0155755 | A1 * | 8/2004 | Bui et al. | 340/10.51 |
| 2005/0008111 | A1 * | 1/2005 | Suzuki | 375/371 |
| 2005/0253638 | A1 * | 11/2005 | Dietrich et al. | 327/198 |
| 2005/0286643 | A1 * | 12/2005 | Ozawa et al. | 375/242 |
| 2008/0266061 | A1 * | 10/2008 | Stiglic et al. | 340/10.5 |

FOREIGN PATENT DOCUMENTS

WO    98/48523    10/1998

OTHER PUBLICATIONS

Search Report issued on corresponding European Application No. EP 07 150 450, completed Jul. 16, 2008.

* cited by examiner

*Primary Examiner* — Daniel St. Cyr
(74) *Attorney, Agent, or Firm* — Griffin & Szipl, P.C.

(57) ABSTRACT

The electronic circuit is intended to form with an antenna a responder that operates without resetting to zero when the power supply of the electronic circuit is switched on (without POR). To increase efficiency and reduce the costs of testing a plurality of such integrated circuits in a wafer, means are provided that allow the logic circuit (8) to be reset to zero during such a test by electrical contact with the pads (P1, P2) of each circuit by using two extractors (12 and 14) of clock signals (CL1 and CL2) connected to the inputs of a generator (20) of a zero reset signal (SR). The state of the generator is essentially given by the difference in pulses received from the two clock signal extractors. As soon as the state of the generator corresponds to a value equal to or greater than a predefined integer, the logic circuit is reset to zero, which never occurs with the responder receiving an interrogation signal of a reader.

8 Claims, 1 Drawing Sheet

ELECTRONIC CIRCUIT FOR A RESPONDER WHICH IS NOT INITIALISED WHEN THE SUPPLY VOLTAGE IS SWITCHED ON

This application claims priority from European Patent Application No. 07150450.0 filed Dec. 27, 2007, the entire disclosure of which is incorporated herein by reference.

FIELD OF THE INVENTION

The present invention relates to the field of electronic circuits for a responder or transponder without POR (power on reset) function, i.e. of non-initialised type when the supply voltage is switched on. The supply voltage is obtained by a rectifier circuit of the electrical signal supplied by the antenna of the responder or transponder.

BACKGROUND OF THE INVENTION

Such a responder sends its message as soon as it receives a sufficient supply voltage for operation of its electronic circuit via its antenna. Moreover, since the responder is not initialised when the supply voltage is switched on, i.e. when the rectified voltage of the interrogation signal received by the responder reaches a value sufficient for operation of this responder, it starts to send a response signal commencing at a random position of the message contained in this response signal. It is provided that it repeats this message so that the reader ultimately receives a complete message by generally identifying the start of a message. Such a communication protocol therefore requires a relatively long communication period. This communication period can also be extended by pauses between the successive transmissions of the message, wherein such pauses are generally provided within the framework of an anti-collision protocol of the responses of several responders located in the field of emission of the same reader.

The operation of the responder of the type described above creates relatively long test times for the electronic circuits intended to form such responders. Such a test is generally conducted on a wafer comprising a high number of electronic circuits, wherein these circuits are tested simultaneously.

The test station applies needles to the two contact pads of each circuit intended to receive the two ends of a coil forming an antenna. In general, the test station supplies a signal corresponding to that of a reader and receives in return response signals from the circuits tested according to the communication protocol provided for the responders. The management of such a test is relatively complex for the test station that receives in parallel a very high number of response messages sent in a non-synchronised and repeated manner, in some cases after pauses of variable and sometime random duration. Therefore, the test requires a certain time to be reliable, and this increases the production cost of electronic circuits.

The aim of the invention is to provide an electronic circuit for the above-described type of responder but configured in order to allow a reliable and quick test of the integrated circuits to be conducted in a wafer, i.e. a batch test of a plurality of such circuits.

In this aim, the invention relates to an electronic circuit intended to form with an antenna a responder that operates without resetting to zero this electronic circuit (in other words, without resetting to the initial state or without the logic circuit being initialised) when the power supply of the electronic circuit is switched on, said electronic circuit comprising first and second contact pads respectively provided for the two ends of said antenna, a first extractor of a first clock signal connected electrically to the first contact pad and a logic circuit associated with a memory. This electronic circuit is firstly characterised in that it comprises a second extractor of a second clock signal electrically connected to the second contact pad and a generator of a zero reset signal of said logic circuit connected as input to the first and second extractors. According to a first embodiment, the electronic circuit is then characterised by the fact that the generator is configured to supply a zero reset signal to the logic circuit as soon as the difference between the number of pulses of the first clock signal and the number of pulses of the second clock signal is equal to or greater than a predefined positive integer. According to a second embodiment of the invention, the electronic circuit is then characterised by the fact that the generator is configured to supply a zero reset signal to the logic circuit as soon as this generator receives from the first extractor a predefined positive whole number of pulses without receiving a pulse from said second extractor during this reception.

According to particular variants, the generator is formed by a reversible counter or by an asynchronous counter, which outputs a signal corresponding to the state of the most significant or highest-order bit (MSB).

Because of the features of the electronic circuit according to the invention, the responder obtained after having connected an antenna to the electronic circuit operates without resetting to zero or initialisation when the supply voltage is switched on, since the electromagnetic signal received from a reader via the antenna of the responder is an alternative signal that creates the same number of pulses in the two extractors of a clock signal with a dual-cycle rectifier. If this number should not be identical in some circumstances, each extractor receives at least a clock pulse regularly. According to the second embodiment mentioned above, the generator of zero reset signals is itself reset to zero or initialised as soon as a pulse is supplied by one of the two given extractors, so that this generator will never supply a zero reset signal to the logic circuit when the corresponding responder receives an interrogation signal of any type from a reader. The difference in pulses of the two clock signals causing the reset to zero of the logic circuit is provided as sufficiently large, i.e. greater than any possible difference that can arise in particular cases, e.g. when the interrogation signal is modulated by a variation in phase or frequency.

Conversely, the circuit according to the invention allows a reset to zero or initialisation of the logic circuit by a test station. In fact, since the test is conducted with needles to establish an electrical connection for contact with the conductive pads of the circuit provided for the antenna, it is easy to supply independent signals to these two pads and to thus create different numbers of pulses in the clock signals supplied by the two clock extractors provided in the circuit according to the invention, which are respectively associated with these two pads.

It is possible in particular during the test to leave one of the two contact pads at a fixed potential so that no pulse is created in the extractor associated with this pad at least during the zero reset phase of the electronic circuits forming a tested wafer.

SUMMARY OF THE INVENTION

The circuit according to the invention thus allows a synchronous test of the plurality of electronic circuits to be conducted and the transmission of a complete message by each electronic circuit forming a tested wafer to be managed temporally.

BRIEF DESCRIPTION OF THE DRAWINGS

The present invention shall be outlined below on the basis of the description of particular embodiments made with reference to the attached figures that are given as non-restrictive examples, wherein.

DETAILED DESCRIPTION OF THE ILLUSTRATIVE EMBODIMENTS

Figure 1:
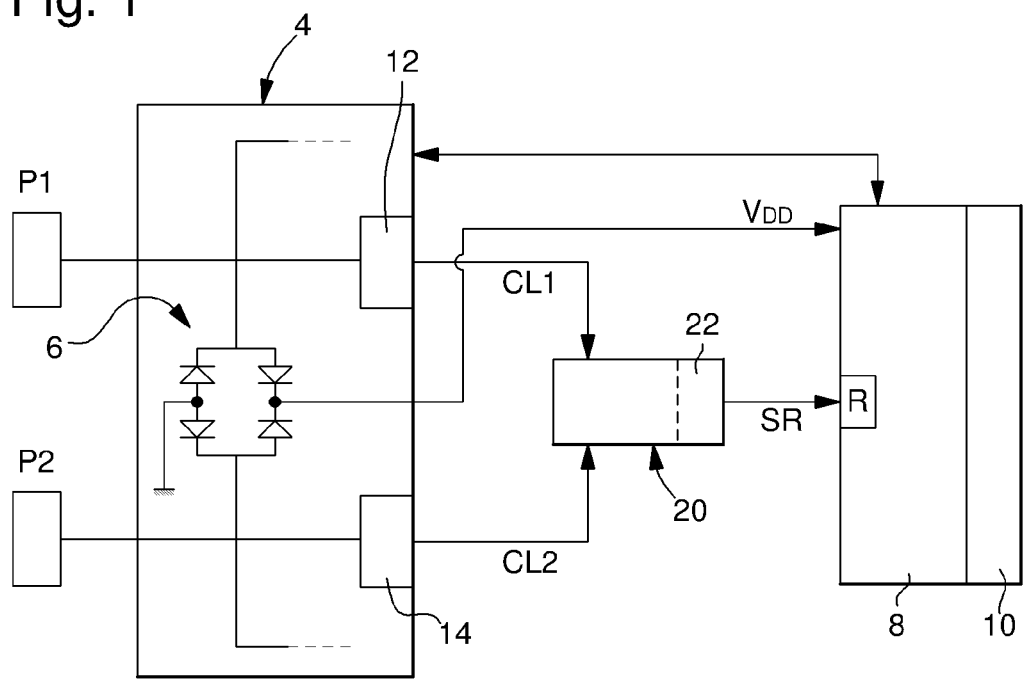
FIG. 1 is a schematic representation of a first embodiment of a circuit according to the invention.

FIG. 1 schematically shows a first embodiment of an electronic circuit intended to form with an antenna a responder that operates without resetting to zero when the power supply of the electronic circuit is switched on. This circuit comprises two contact pads P1 and P2. To obtain a responder, it is provided to electrically connect the two ends of a coil forming an antenna respectively to these two contact pads. The circuit comprises a front portion 4, in which a dual-cycle rectifier 6, also referred to as a full-wave rectifier, is configured in particular. This rectifier supplies the supply voltage VDD to the logic circuit 8 of the electronic circuit. This logic circuit is associated with a memory 10, in which a response message of the responder is stored.

According to the invention, the two contact pads P1 and P2 are respectively connected to the first and second clock extractors 12 and 14 that respectively supply two clock signals CL1 and CL2. Given the symmetrical design with the full wave rectifier, the two clock extractors respectively receive the first and the second cycle of an alternative signal formed in a coil antenna connected to the two contact pads P1 and P2. Thus, normally, the first clock signal CL1 comprises an identical number of pulses to the clock signal CL2 when the electronic circuit according to the invention is connected to an antenna to form a responder. A clock extractor supplied a digital signal defining a succession of pulses that allow in particular a logic circuit to be set. A pulse is defined, for example, by the shift from low level to high level (ascending flank) or by the opposite shift (descending flank) in the clock signal created by the extractor.

According to the invention, the electronic circuit additionally comprises a generator 20 of a zero reset signal of the logic circuit 8. In the case of the first embodiment described here, the generator 20 is configured to supply the zero reset signal as soon as the difference between the number of pulses of the first clock signal CL1 and the number of pulses of the second clock signal CL2 is equal to or greater than a predetermined positive integer N1. For reasons of security of use, it is preferably provided that the number N1 is greater than or equal to two, preferably equal to four.

According to a first variant, the generator 20 comprises two counters respectively associated with the inputs receiving the signals CL1 and CL2. The respective values of these two counters are supplied to a logic subtraction unit 22, which is configured to supply a zero reset signal SR to the logic circuit 8 when the result is equal to the number N1 greater than 1. In a variant, the subtraction unit 22 allows a difference to be calculated up to a maximum value higher than N1. When the subtraction result reaches N1, the logic circuit 8 is reset to the initial state and remains in this state until said maximum value is reached. As soon as this maximum value is exceeded, the zero reset state is unlocked and the two counters of the generator are reset to zero.

In another variant, the generator 20 is essentially formed by a reversible counter that receives the clock signals CL1 and CL2 as input. This reversible counter is associated with a logic circuit 22 that sends a zero reset signal SR when the value of the reversible counter reaches the value N1.

The zero reset signal SR can be formed by a pulse sent to the logic circuit 8 when the value N1 is reached by the generator 20. It can be provided that such a pulse is sent each time the state of the reversible counter corresponds to an integral multiple of the given value N1.

Figure 2:
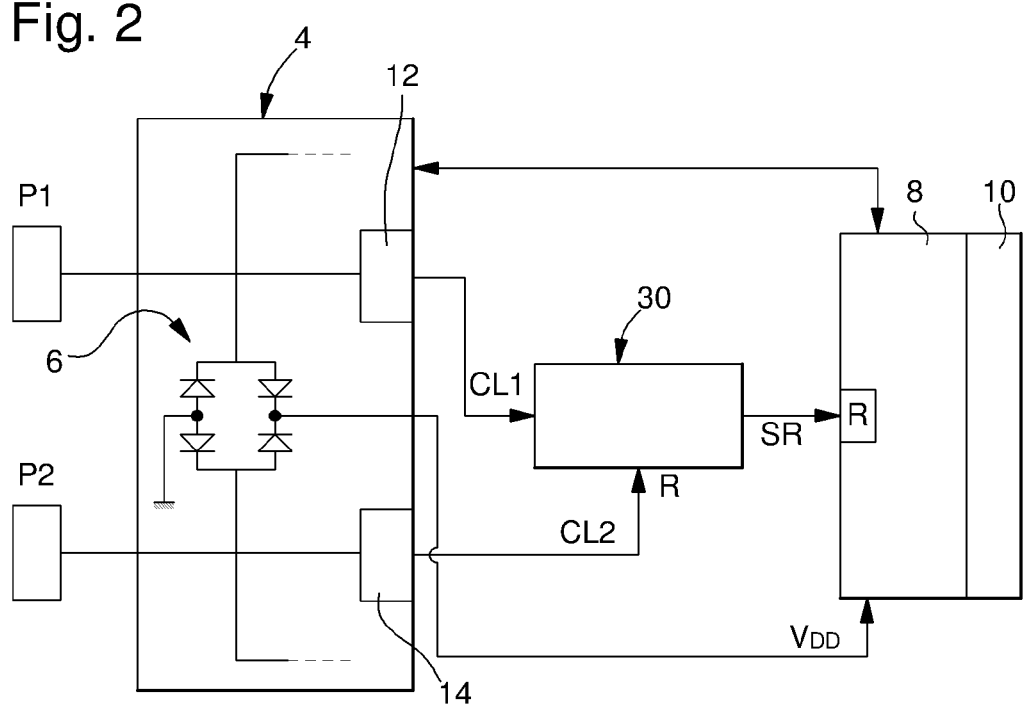
FIG. 2 is a schematic representation of a second embodiment of the invention.

A second embodiment of the electronic circuit according to the invention will be described on the basis of FIG. 2, said circuit being characterised in particular by the fact that the generator 30 of the zero reset signal SR supplied to the logic circuit 8 is configured to create such a signal SR as soon as this generator 30 receives a predetermined positive whole number N2 of pulses from the first clock extractor CL1 without receiving any pulse from the second extractor 14 of the second clock signal CL2. The references already described above will not be described again in detail here.

According to a preferred variant, the generator 30 is formed by an asynchronous counter that outputs a signal corresponding to the most significant or highest-order bit (MSB). This output signal serves to directly form the zero reset signal SR.

The clock signal CL2 supplied by the second extractor 14 actuates a reset to zero of the asynchronous counter 30. Thus, as soon as the generator 30 receives a pulse from the clock extractor 14, the asynchronous counter starts to count from zero again. It is thus understood that this circuit connected to an antenna receiving an alternative electromagnetic signal can never reset the logic circuit 8 to zero, given that the generator 30 could never reach the predefined value N2, since it receives periodically, normally on the second cycle of the electromagnetic signal, a zero reset pulse R. A value equal to two can be selected for N2, but as a security measure the value of N2 is preferably equal to four, even eight.

Other variants can be envisaged by a person skilled in the art without departing from the spirit of the present invention. It is noted in particular that in the first or second embodiment, the maximum value that can be taken by the generator 20 or 30 can be equal to the predefined value N1 or N2 respectively. The logic circuit 8 is thus reset to zero when the generator reaches the value N1 and N2 respectively and remains in this initial state until a new clock signal CL1 causes a return to zero of the generator, since the maximum value that can be taken by the generator has thus been exceeded. The generator has a cyclical operation.

What is claimed is:

1. An electronic circuit adapted for connection to an antenna to form a responder that operates without resetting to zero when a power supply of the electronic circuit is switched on, the electronic circuit comprising:
   (a) first and second contact pads respectively adapted for connection with first and second ends of the antenna;
   (b) a first extractor of a first clock signal electrically connected to the first contact pad;
   (c) a logic circuit associated with a memory;
   (d) a second extractor of a second clock signal electrically connected to the second contact pad; and
   (e) a generator of a zero reset signal of the logic circuit connected as input to the first and second extractors,
   wherein the generator is configured to supply the zero reset signal to the logic circuit as soon as a difference between a number of pulses of the first clock signal and a number of pulses of the second clock signal is equal to or greater than a predefined positive integer.

2. The electronic circuit according to claim 1, wherein the generator is formed by a reversible counter.

3. An electronic circuit adapted for connection to an antenna to form a responder that operates without resetting to zero when a power supply of the electronic circuit is switched on, the electronic circuit comprising:
   (a) first and second contact pads respectively adapted for connection with first and second ends of the antenna,
   (b) a first extractor of a first clock signal electrically connected to the first contact pad;
   (c) a logic circuit associated with a memory;
   (d) a second extractor of a second clock signal electrically connected to the second contact pad; and
   (e) a generator of a zero reset signal of the logic circuit connected as input to the first and second extractors,
   wherein the generator is configured to supply the zero reset signal to the logic circuit as soon as the generator receives from the first extractor, a predefined positive whole number of pulses without receiving a pulse from the second extractor during this reception.

4. The electronic circuit according to claim 3, wherein the generator is formed by an asynchronous counter that outputs a signal corresponding to a state of the most significant or highest-order bit.

5. A responder that operates without resetting to zero when a power supply of an electronic circuit is switched on, the responder comprising:
   (i) the electronic circuit; and
   (ii) an antenna connected to the electronic circuit,
   wherein the electronic circuit comprises
      (a) first and second contact pads respectively provided for first and second ends of the antenna;
      (b) a first extractor of a first clock signal electrically connected to the first contact pad;
      (c) a logic circuit associated with a memory;
      (d) a second extractor of a second clock signal electrically connected to the second contact pad; and
      (e) a generator of a zero reset signal of the logic circuit connected as input to the first and second extractors,
      wherein the generator is configured to supply the zero reset signal to the logic circuit as soon as the difference between a number of pulses of the first clock signal and a number of pulses of the second clock signal is equal to or greater than a predefined positive integer.

6. The responder according to claim 5, wherein the generator is formed by a reversible counter.

7. A responder that operates without resetting to zero when a power supply of an electronic circuit is switched on, comprising:
   (i) the electronic circuit; and
   (ii) an antenna connected to the electronic circuit,
   wherein the electronic circuit comprises
      (a) first and second contact pads respectively provided for first and second ends of the antenna,
      (b) a first extractor of a first clock signal electrically connected to the first contact pad;
      (c) a logic circuit associated with a memory;
      (d) a second extractor of a second clock signal electrically connected to the second contact pad; and
      (e) a generator of a zero reset signal of the logic circuit connected as input to the first and second extractors,
      wherein the generator is configured to supply the zero reset signal to the logic circuit as soon as the generator receives from the first extractor a predefined positive whole number of pulses without receiving a pulse from the second extractor during this reception.

8. The responder according to claim 7, wherein the generator is formed by an asynchronous counter that outputs a signal corresponding to a state of the most significant or highest-order bit.

* * * * *